United States Patent
Ji

(10) Patent No.: US 9,367,055 B2
(45) Date of Patent: Jun. 14, 2016

(54) SYSTEM AND METHOD FOR IMPLEMENTING MODEL PREDICTIVE CONTROL IN PLC

(71) Applicant: Kun Ji, Plainsboro, NJ (US)

(72) Inventor: Kun Ji, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 599 days.

(21) Appl. No.: 13/855,178

(22) Filed: Apr. 2, 2013

(65) Prior Publication Data

US 2014/0297002 A1    Oct. 2, 2014

(51) Int. Cl.
*G05B 13/02*    (2006.01)
*G05B 13/04*    (2006.01)

(52) U.S. Cl.
CPC .................................. *G05B 13/048* (2013.01)

(58) Field of Classification Search
CPC ....................................................... G05B 13/00
USPC ........................................................... 700/30
See application file for complete search history.

(56) References Cited

U.S. PATENT DOCUMENTS

| 2006/0111858 A1* | 5/2006 | Zhu ........................ G05B 17/02 702/85 |
| 2006/0141107 A1 | 6/2006 | Schwimmer et al. |
| 2007/0225835 A1* | 9/2007 | Zhu ...................... G05B 13/042 700/44 |
| 2011/0267013 A1 | 11/2011 | Marken et al. |

OTHER PUBLICATIONS

PCT International Search Report mailed Jun. 18, 2014 corresponding to PCT International Application No. PCT/US2014/031971 filed Mar. 27, 2014 (14 pages).
S. Joe Qin, et al. "A Survey of Industrial Model Predictive Control Technology". In Control Engineering Practice, vol. 11, Jan. 1, 2003 (pp. 733-764).
Bryan T. Griffen: "The Design and Evaluation of a PLC-Based Model Predictive. Controller for Application in Industrial Food Processes." Dec. 1, 2003, XP055121542, Northern Iowa. Retrieved from the internet: URL:http://202.28.199.34/multim/3112376.pdf p. 3, last paragraph—p. 4, paragraph 1. p. 19, paragraph 2.
J. Fotopoulos, "Process Control and Optimization Theory—Application to Heat Treating Processes," Air Products and Chemicals, Inc., Pub. No. 330-06-038-US (2006).

* cited by examiner

*Primary Examiner* — Mohammad Ali
*Assistant Examiner* — Sheela S Rao

(57) ABSTRACT

A Model Predictive Control (MPC) framework is implemented as part of the run-time system function features of a Programmable Logic Controller (PLC) system. Optimal control calculations are performed in the run-time MPC function block of the PLC. The optimal control function is determined by an MPC block in an engineering tool of the PLC, using a system dynamic matrix containing measurements from a unit step response test performed by the PLC.

20 Claims, 6 Drawing Sheets

SYSTEM AND METHOD FOR IMPLEMENTING MODEL PREDICTIVE CONTROL IN PLC

FIELD OF THE INVENTION

This invention relates generally to the control of industrial processes using a programmable logic controller (PLC). More particularly, the invention relates to methods, systems and computer readable media for controlling industrial processes using a model predictive control (MPC) framework implemented in a PLC.

BACKGROUND OF THE INVENTION

PLCs have been widely used in numerous industries. They are commonly used in the control of machinery, such as factory assembly lines and manufacturing equipment. Current PLCs, however, do not have the capability to implement advanced control methods, such as the Model Predictive Control method, due to limited computational power and a lack of a framework capable of implementing MPC with that limited computational power. That limitation has significantly affected the application of PLCs in chemical plants, oil refineries and similar applications.

Current PLC system design does not provide for advanced control methods. Instead, only simple control algorithms such as proportional/integral/derivative (PID) control may be implemented as the system function to be used by the PLC. If not impossible, it would require prohibitive engineering effort to manually implement an MPC algorithm in current PLC platform.

SUMMARY OF THE INVENTION

The present invention addresses the needs described above by providing a method for controlling process equipment via a programmable logic controller. A processor implementing a model predictive control engineering tool receives model predictive control engineering parameters; commands the programmable logic controller to perform a model identification operation on the process equipment; and receives, from the programmable logic controller, results from the model identification operation. The processor further constructs a system process model for the process equipment, using the results from the model identification operation, and constructs control logic for the process equipment. The system process model and the control logic are then downloaded to the programmable logic controller.

In one embodiment, the system process model is a dynamic matrix model. The system process model may alternatively be a state-space representation, an autoregressive model with external input or an autoregressive moving average model with external input.

In another aspect of the invention, a non-transitory computer-usable medium is provided having computer readable instructions stored thereon for execution by a processor to perform operations for controlling a system as described above.

Another aspect of the invention is a model predictive control engineering tool for programming a programmable logic controller to implement model predictive control. The engineering tool comprising a processor and a non-transitory computer-usable medium having computer readable instructions stored thereon that, when executed by the processor, cause the processor to perform operations for controlling process equipment via a programmable logic controller, as described above.

DESCRIPTION OF THE INVENTION

The MPC-enabled PLC platform described herein provides a new system control function block that permits an MPC algorithm to be easily used by a PLC user. An associated engineering tool for system dynamic model identification is integrated into the existing PLC Engineering Tool and is used off line to build a process dynamic model that is then used by the MPC system control function block during run-time.

PLCs are widely used in the automation and control industry because PLCs are adaptable, modular, and user-friendly. However, because of the limited computational power of the PLC, the PLC does not provide advanced control algorithms such as MPC. The most popular control algorithm provided by PLC is the PID control algorithm.

Figure 1:
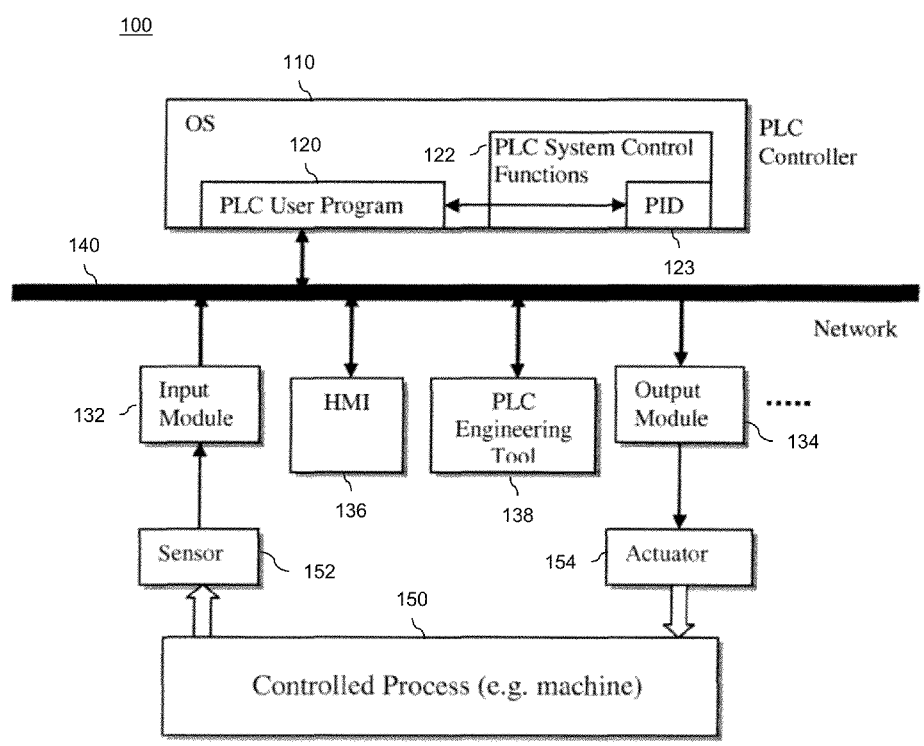
FIG. 1 is a schematic block diagram showing a prior art PLC framework.

A typical PLC control system 100, including a PLC controller and Operating System 110, is shown in FIG. 1. A PLC user program 120 runs on the PLC controller 110 to implement a specific control application. The PLC user program 120 calls PLC system control functions 122 during execution.

PID control 123 is the most widely used PLC system control function block for industry control and automation applications. For some control applications with more complex and dynamic processes, however, more advanced control algorithms such as MPC are needed. Due to the limited computational power of a PLC, however, many of those advanced control algorithms cannot be implemented in the PLC, and are therefore not available as PLC system control functions 122.

Model Predictive Control is widely used in chemical plants and oil refineries. Because no framework is available for implementing MPC using a PLC, MPC is implemented using more complex and less user-friendly hardware. That has negatively affected the adoption of PLCs in the chemical and oil industries.

The PLC controller 110 is connected, through a factory network 140 or other network, to PLC input modules 132 and output modules 134, which are connected to sensors 152 and actuators 154, respectively, in the controlled process 150. A human machine interface (HMI) 136 is provided for the user to monitor the control process.

A PLC engineering tool 138 allows the user to configure the PLC system parameters and create the PLC user program 120.

Due to the increased speed and capacity of available CPU chips, PLC controllers now have increased computing power. The presently described techniques utilize that increased computing power, together with a novel implementation of the MPC algorithm in the PLC system control functions, to make MPC an available function for use in a PLC user program.

Figure 2:
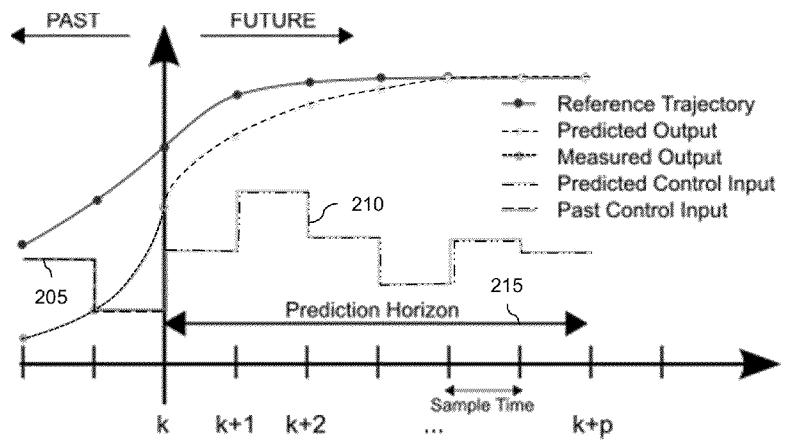
FIG. 2 is a plot of a typical model predictive control schema.

MPC is based on an iterative, finite horizon optimization of a model of the process to be controlled. MPC is also called "receding horizon control" because the prediction horizon is repeatedly shifted forward. An illustration of a discrete MPC scheme is shown in FIG. 2. At each time instance k=1, 2, ..., p, MPC uses several components to calculate a series of optimum future control moves 210. The components used in the calculation include an internal dynamic model of the process, a history of past control moves 205 and an optimization cost function J over the receding prediction horizon 215. Only the first of the series of control moves is applied, after which a new series of future control moves is calculated.

Figure 3:
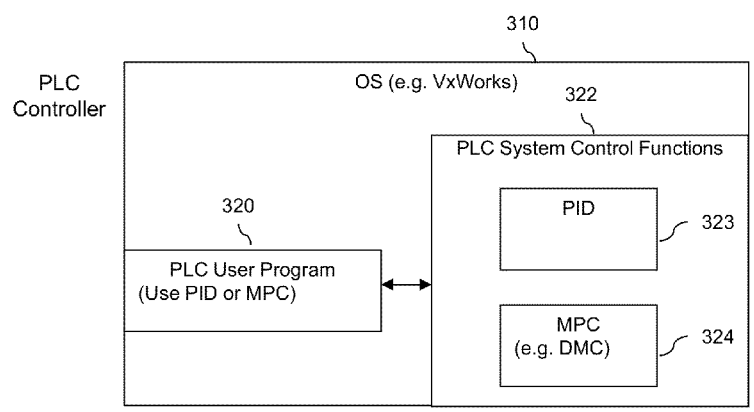
FIG. 3 is an architectural overview of a PLC controller framework in accordance with one embodiment of the invention.

In the presently described configuration of a PLC controller 310, shown in FIG. 3, a new MPC system control function block 324 is added to the PLC system control functions 322. That MPC system control function block 324 is directly called by the PLC user program 320 to perform model predictive control, in the same manner that the PID function block 323 may be called to perform proportional/integral/derivative control.

Figure 5:
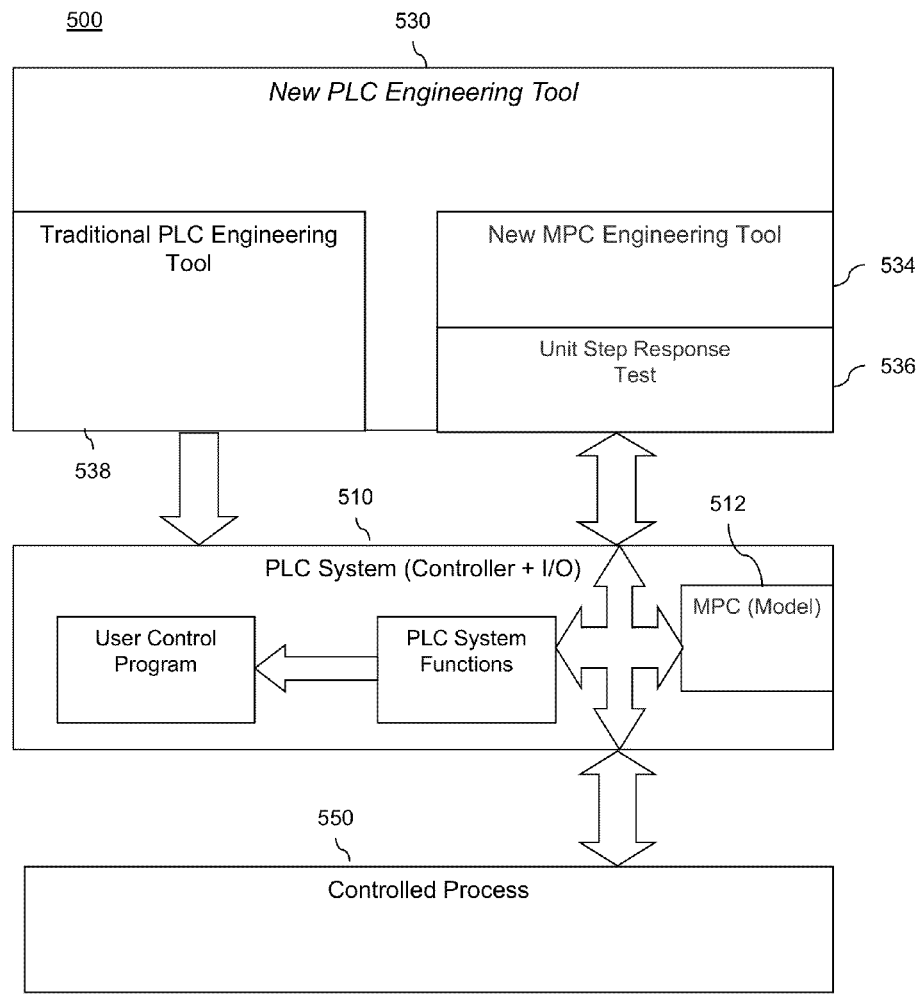
FIG. 5 is an architectural overview of a PLC engineering tool and controller framework in accordance with one embodiment of the invention.

The model used by the MPC function block is created offline by a model identification tool of the new MPC engineering tool 534 that is integrated in a modified PLC engineering tool 530, as shown in FIG. 5. A preferred technique for model identification is the use of a unit step response test to create a system dynamic matrix model of controlled process. An MPC algorithm of that type is also called a dynamic matrix control (DMC) algorithm.

Figure 4:
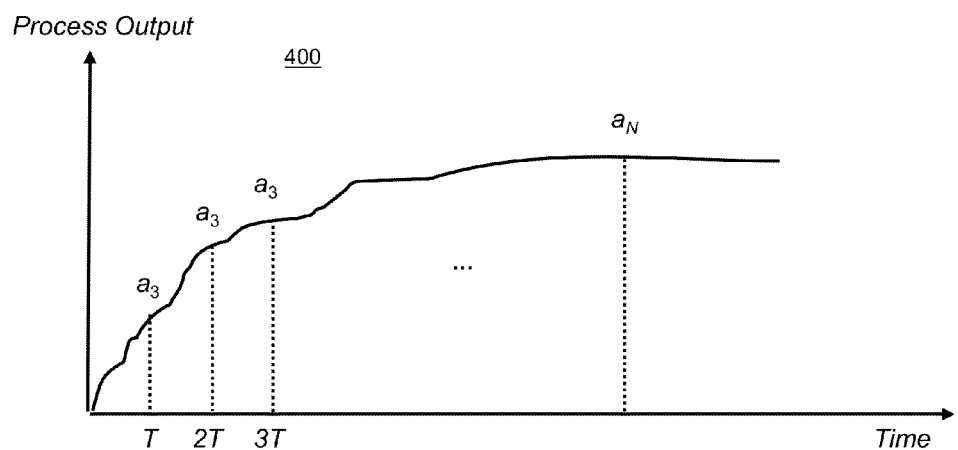
FIG. 4 is a plot of results obtained in a unit step open loop response test in accordance with one embodiment of the invention.

In an example unit step response test 400 for DMC, shown in FIG. 4, data is sampled from the process output $\{a_1, a_2, \ldots, a_N\}$ with sampling time T. The resulting matrix is used as the predictive model.

Using predictive models, the process output may be predicted by setup input control increment:

$$\hat{Y}_{PM}(k+1) = A_0 \Delta U(k-1) + A \Delta U(k) \quad (1)$$

where $\hat{Y}_{PM}(k+1) = [\hat{y}_M(k+1|k) \ldots \hat{y}_M(k+P|k)]^T$ is the output vector of the predictive model in future P instants and $\Delta U(k) = [\Delta u(k) \ldots \Delta u(k+M-1)]^T$ is the unknown control increment vector in future M instants and $\Delta U(k-1) = [\Delta u(k-N+P) \ldots \Delta u_{k-1}T$ is the known control increment vector in past N–P instants. The system dynamic matrix is:

$$A_0 = \begin{bmatrix} a_{N\ldots P+1} & a_{N-P} & \ldots & a_2 \\ a_{N\ldots P+2} & a_{N-P+1} & \ldots & a_3 \\ \ldots & \ldots & \ldots & \ldots \\ a_N & a_{N-1} & \ldots & a_{P+1} \end{bmatrix}_{P \times (N-P)}$$

$$A = \begin{bmatrix} a_1 & 0 & \ldots & 0 \\ a_2 & a_1 & \ldots & 0 \\ \ldots & \ldots & \ldots & \ldots \\ a_P & a_{P-1} & \ldots & a_{P-M+1} \end{bmatrix}_{P \times M}$$

The system dynamic matrix describes the system process model and can be obtained off line and stored in the run time MPC control function block 324 of the PLC controller 310 (FIG. 3). In the presently described arrangement, that is realized by the new PLC engineering tool 530 (FIG. 5) which integrates the MPC engineering tool 534 to perform the unit step response test 536 and construct the system process model. Actual system feedback output is used to readjust the prediction value:

$$\hat{Y}_P(k+1) = \hat{Y}_{PM}(k+1) + h[y(k) - y_{PM}(k)] = A\Delta U(k) + A_0 \Delta U(k-1) + he(k) \quad (2)$$

where $\hat{Y}_P(k+1) = [\hat{y}_P(k+1) \ldots \hat{y}_P(k+P)]^T$ is the output predictive vector of the system in future P instants, where P is the prediction horizon, $e(k) = y(k) - y_{PM}(k) = y(k) - [a_{N-P}\ a_{N-P+1}\ \ldots\ a_1]\Delta U(k-1)$ is the output error of the predictive model at the time instant k, and $h = [h_1 \ldots h_P]^T$ is an error correction factor array containing the correction factors of the error.

The optimization problem is then formulated as:

$$\min J_P = [Y_r(k+1) - \hat{Y}_P(k+1)]^T Q[Y_r(k+1) - \hat{Y}_P(k+1)] + \Delta U^T(k) \lambda \Delta U(k) \quad (3)$$

where $Y_r(k+1) = [y_r(k+1) \ldots y_r(k+P)]^T$ is the desired output value for future P instants, and $Q = \text{diag}(q_1, q_1, \ldots, q_P)$ and $\lambda = \text{diag}(\lambda_1, \lambda_1, \ldots, \lambda_P)$ are cost weighting coefficient arrays.

The optimal control is:

$$\Delta U(k) = (A^T Q A + \lambda)^{-1} A^T Q [Y_r(k+1) - A_0 \Delta U(k-1) - he(k)] \quad (4)$$

where $\Delta u(k)$ is the first row of $\Delta U(k)$ and adopted to constitute the real control law to generate the actuator input $u(k) = u(k-1) + \Delta u(k)$.

Referring to FIG. 3, the calculations in the above equation are implemented in the run-time MPC function block 324, with proper parameters set through the MPC engineering tool during off-line engineering set-up. The MPC function block 324 handles the model predictive control task in run-time and provides controller output to the actuators to control the process.

Other MPC modeling techniques, such as a state-space representation, an autoregressive model with external input (ARX) or an autoregressive moving average model with external input (ARMAX) may alternatively be implemented in the MPC function block 324.

Operation of the PLC includes online real-time actuation control, off-line parameter configuration, and user programming using the PLC engineering tool. The MPC function block described herein therefore includes two parts: (1) a run-time part and (2) an engineering-time part.

The detailed engineering-time usage of the described system 500 is shown in FIG. 5. The new PLC engineering tool 530 includes a new MPC engineering tool 534 as well as the traditional PLC engineering tool 538. The MPC modeling method as shown in equation (1) above is integrated into the new PLC engineering tool 530. The new MPC engineering tool 534 provides a unit step response test tool 536 that automatically aggregates the sampling data from the controlled process 550 (through the PLC system 510) and constructs the system dynamic matrix to be used by the PLC system 510 as the MPC model 512.

Figure 6:
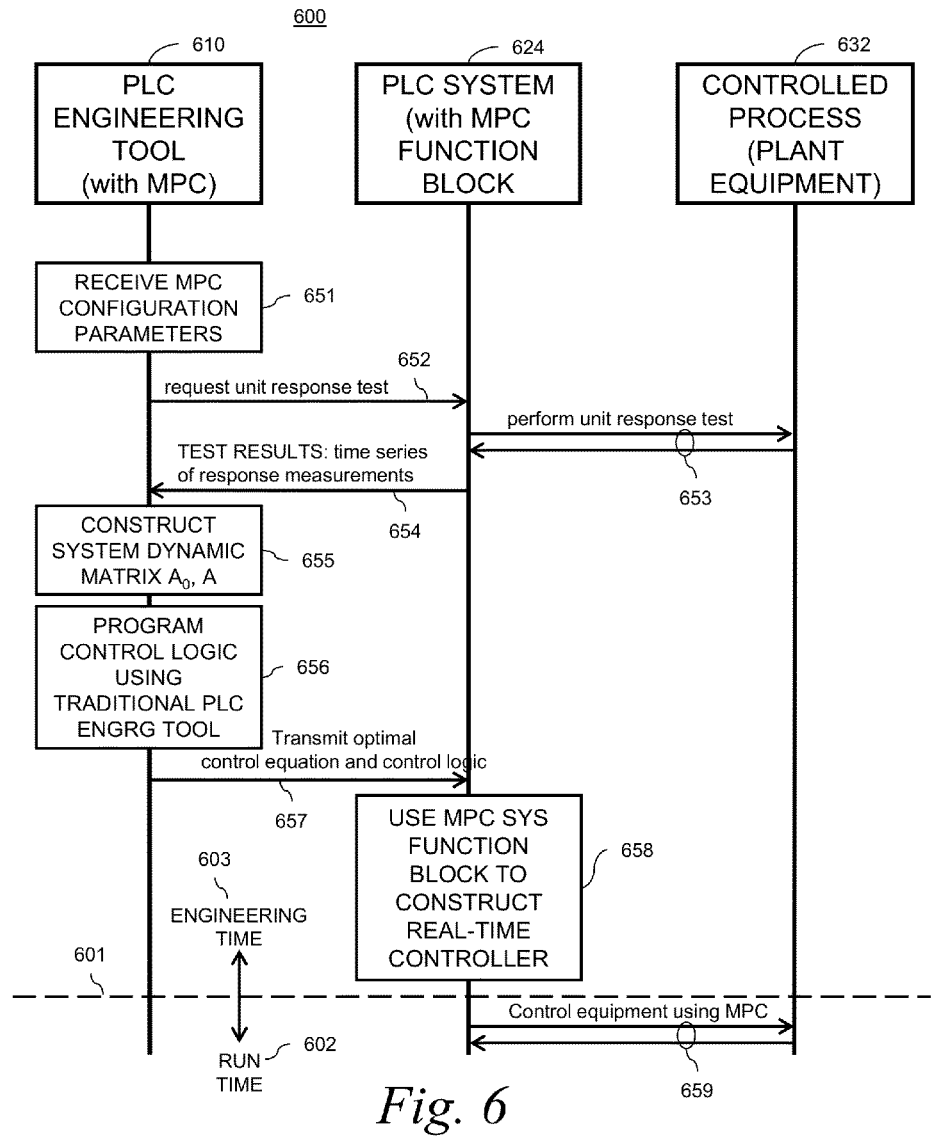
FIG. 6 is a sequence diagram of a method for controlling a process in accordance with one embodiment of the invention.

The key operations of the presently described system are illustrated in an exemplary sequence chart 600 shown in FIG. 6. The sequence chart is divided by the dashed line 601 into a run-time sequence 602 and an engineering-time sequence 603. The exemplary embodiment shown in the chart 600 utilizes DMS as the MPC method.

The PLC engineering tool 610 corresponds to the engineering tool 530 shown in FIG. 5. The PLC engineering tool 610 includes both a traditional PLC engineering tool and an MPC engineering tool capable of performing a model discovery function such as a unit response test, and is also capable of constructing the model used by the MPC function block of the PLC controller.

In preparation for the configuration sequence 600, a proper PLC system 624 including the controller and the I/O hardware must be chosen, and the PLC system must be connected to the controlled process 632. For example, the PLC system must be configured to receive information from sensors in the controlled process, and the PLC system must be configured to transmit commands to actuators in the controlled process. The PLC system includes an MPC function block as well as other control function blocks such as PID, to be called by the PLC user program during real-time control.

Configuration parameters for MPC are received (block 651) by the PLC engineering tool 610. Those configuration parameters may, for example, be manually input during the configuration process. The parameters include those used in equations (2) and (3) above. In particular, an error correction factor h, and cost factor diagonal matrices Q and λ are among the received parameters.

The unit step test is then performed. This process may be fully or partially automated by the PLC engineering tool 610, which may communicate a request 652 to perform a unit response test to the PLC controller 624. The request 652 may be a single command or may be a series of incremental commands transmitted as the unit response test is performed. The unit response test is then performed (arrows 653) by providing test process inputs to the controlled process 632 and by measuring open loop process responses over a series of unit time increments.

Data from the unit response test is transmitted (arrow 654) to the PLC engineering tool 610 where a system dynamic matrix is constructed and saved (block 655) as the process model. The traditional PLC engineering function block of the PLC engineering tool 610 is then used to program control logic (block 656), and the control logic, together with the optimal control equation, are downloaded from the engineering tool 610 to the PLC system 624, as shown by arrow 657. The MPC system function block is then used to construct (block 658) the real time controller in the PLC system 624.

During run-time, the process 632 is controlled (arrows 659) using the PLC system with the MPC system function block 624. The new MPC function block 324 (FIG. 3) can be used the same way as the PID function block 323. Process value prediction and the optimal control calculation are done within the new MPC function block, and the output from that function block is the optimized control for the controlled process.

Figure 7:
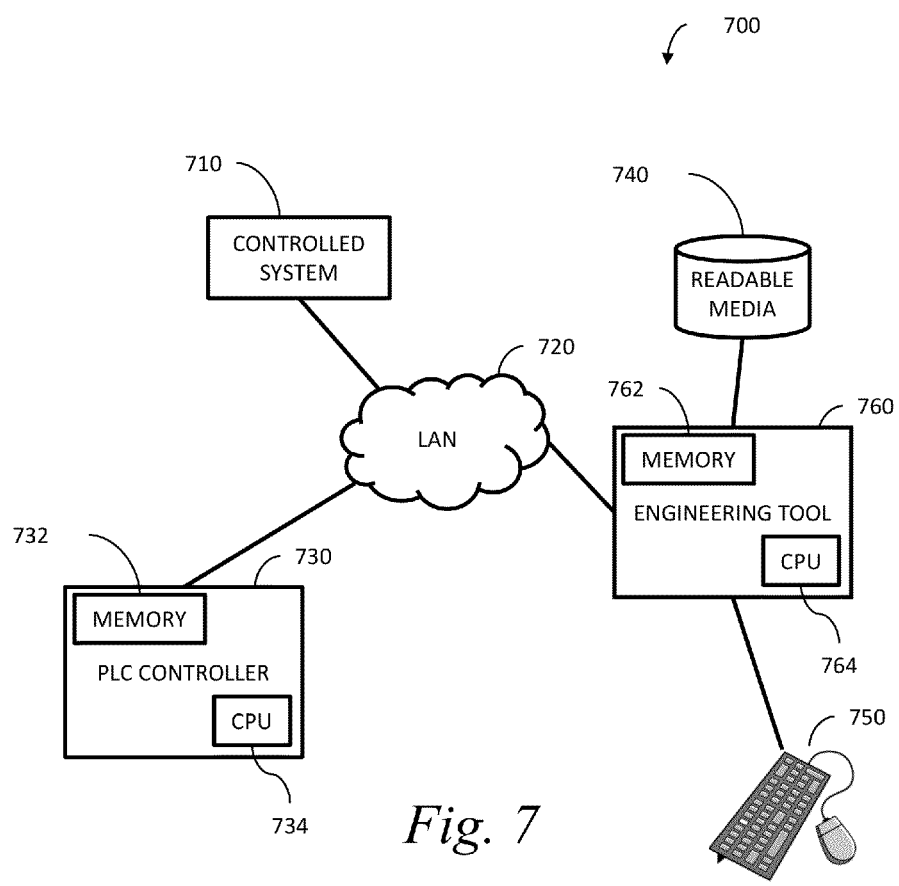
FIG. 7 is a system schematic depicting a PLC and engineering tool in accordance with one embodiment of the invention.

The elements of the methodology as described above use an industrial control system that may he implemented as a computer system comprising a single unit or a plurality of units linked by a network or a bus. An exemplary system 700 is shown in FIG. 7.

A PLC engineering tool 760 may reside on a data processing device such as a dedicated industrial controller, a mainframe computer, a desktop or laptop computer or any other device capable of processing data and communicating with other devices directly or through a local area data network (LAN) 720. The PLC engineering tool 760 receives data from any number of data sources that may be connected to the engineering tool, directly or through the LAN 720. The engineering tool 760 is connected for communication with the PLC controller 730 either directly, through the LAN 720 or through another network.

The PLC engineering tool 760 includes a central processing unit (CPU) 764 and a memory 762. The engineering tool 760 can be configured to operate and display information by using, e.g., the HMI input and output devices 750 to execute certain tasks.

The CPU 764, when configured using software according to the present disclosure, includes modules that are configured to perform one or more methods for configuring a PLC controller as discussed herein.

The memory 762 may include a random access memory (RAM) and a read-only memory (ROM). The memory may also include removable media such as a disk drive, tape drive, memory card, etc., or a combination thereof. The RAM functions as a data memory that stores data used during execution of programs in the CPU 764; the RAM is also used as a work area. The ROM functions as a program memory for storing a program executed in the CPU 764. The program may reside on the ROM or on any other tangible or non-volatile computer-usable media, such as computer readable media 740, as computer readable instructions stored thereon for execution by the CPU or another processor to perform the methods of the invention. The ROM may also contain data for use by the program or other programs.

The PLC controller 730 may also reside on a data processing device such as a dedicated industrial controller, a mainframe computer, a desktop or laptop computer or any other device capable of processing data and communicating with other devices directly or through a local area data network (LAN) 720. The PLC controller 730 includes a CPU 734 and a memory 732. The PLC controller 730 may include input and output devices (not shown) permitting a user to interact with the CPU 734. The PLC controller 730 is configured by the engineering tool 760 to construct a real-time controller including MPC for controlling a system 710. Input and output modules (see FIG. 1) of the PLC controller communicate with components of the controlled system 710 either directly or through the LAN 720 or through a wide area network such as the Internet.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in further detail here.

In sum, the proposed framework provides an innovative solution for implementing an MPC algorithm on a PLC platform to fully utilize the PLC CPU computational power. A new MPC function block is added to the existing PLC system functions to be easily used to execute a model predictive control algorithm. The additional engineering tool required by the MPC function block to generate the controlled process dynamic model is also integrated into the existing PLC engineering tool.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for controlling process equipment via a programmable logic controller, comprising:
by a processor implementing a model predictive control engineering tool, receiving model predictive control engineering parameters;
by the processor, commanding the programmable logic controller to perform a model identification operation on the process equipment;
by the processor, receiving, from the programmable logic controller, results from the model identification operation;
by the processor, constructing a system process model for the process equipment, using the results from the model identification operation;
by the processor, implementing a programmable logic control engineering tool to construct a control logic for the process equipment; and
downloading the system process model to a model predictive control function block in the programmable logic controller and the control logic to a proportional/integral/derivative function block in the programmable logic controller, both function blocks called to implement process equipment control.

2. A method as in claim 1, wherein the model predictive control engineering parameters comprise: an error correction factor array, a prediction horizon and a cost weight coefficient array.

3. A method as in claim 1, wherein the system process model is a dynamic matrix model.

4. A method as in claim 3, wherein the model identification operation comprises a unit step open loop response test.

5. A method as in claim 4, wherein the unit step open loop response test comprises:
transmitting a control command to the process equipment via the programmable logic controller; and
receiving by the programmable logic controller a series of response measurements from the process equipment.

6. A method as in claim 5, wherein the transmitting is through an output module of the programmable logic controller and the receiving is through an input module of the programmable logic controller.

7. A method as in claim 3, wherein the system process model implements the following:

$$\Delta U(k)=(A^TQA+\lambda)^{-1}A^TQ[Y_r(k+1)-A_0\Delta U(k-1)-he(k)]$$

where $\Delta U(k)$ is an unknown control increment vector, A and $A_0$ comprise the system dynamic matrix, Q and $\lambda$ are cost weighting functions, $Y_r(k+1)$ is a desired output for a future P instants, $\Delta U(k-1)$ is a known control increment vector, h is an error correction faction and $e(k)$ is an output error of the model at time k.

8. A method as in claim 1, wherein the system process model is a model selected from the group consisting of a state-space representation, an autoregressive model with external input and an autoregressive moving average model with external input.

9. A method as in claim 1, wherein the model predictive control engineering tool and the programmable logic control engineering tool comprise a tool suite with a single human-machine interface.

10. A non-transitory computer-usable medium having computer readable instructions stored thereon that, when executed by a processor, cause the processor to perform operations for controlling process equipment via a programmable logic controller, the operations comprising:
receiving model predictive control engineering parameters;
commanding the programmable logic controller to perform a model identification operation on the process equipment;
receiving, from the programmable logic controller, results from the model identification operation;
constructing a system process model for the process equipment, using the results from the model identification operation in a model predictive engineering tool;
constructing a control logic for the process equipment in a programmable logic control engineering tool; and
downloading the system process model to a model predictive control function block in the programmable logic controller and the control logic to a proportional/integral/derivative function block in the programmable logic controller, both function blocks called to implement process equipment control.

11. A non-transitory computer-usable medium as in claim 10, wherein the model predictive control engineering parameters comprise: an error correction factor array, a prediction horizon and a cost weighting coefficient array.

12. A non-transitory computer-usable medium as in claim 10, wherein the system process model is a dynamic matrix model.

13. A non-transitory computer-usable medium as in claim 12, wherein the model identification operation comprises a unit step open loop response test.

14. A non-transitory computer-usable medium as in claim 13, wherein the unit step open loop response test comprises:
transmitting a control command to the process equipment via the programmable logic controller; and
receiving by the programmable logic controller a series of response measurements from the process equipment.

15. A non-transitory computer-usable medium as in claim 14, wherein the transmitting is through an output module of the programmable logic controller and the receiving is through an input module of the programmable logic controller.

16. A non-transitory computer-usable medium as in claim 12, wherein the system process model implements the following:

$$\Delta U(k)=(A^TQA+\lambda)^{-1}A^TQ[Y_r(k+1)-A_0\Delta U(k-1)-he(k)]$$

where $\Delta U(k)$ is an unknown control increment vector, A and $A_0$ comprise the system dynamic matrix, Q and $\lambda$ are cost weighting functions, $Y_r(k+1)$ is a desired output for a future P instants, $\Delta U(k-1)$ is a known control increment vector, h is an error correction faction and $e(k)$ is an output error of the model at time k.

17. A non-transitory computer-usable medium as in claim 10, wherein the system process model is a model selected from the group consisting of a state-space representation, an autoregressive model with external input and an autoregressive moving average model with external input.

18. A non-transitory computer-usable medium as in claim 10, wherein the model predictive control engineering tool and the programmable logic control engineering tool comprise a tool suite with a single human-machine interface.

19. A model predictive control engineering tool for programming a programmable logic controller to implement model predictive control, the engineering tool comprising a processor and a non-transitory computer-usable medium having computer readable instructions stored thereon that, when executed by the processor, cause the processor to perform operations for controlling process equipment via a programmable logic controller, the operations comprising:

receiving model predictive control engineering parameters;

commanding the programmable logic controller to perform a model identification operation on the process equipment;

receiving, from the programmable logic controller, results from the model identification operation;

constructing a system process model for the process equipment, using the results from the model identification operation;

constructing a control logic for the process equipment utilizing an included programmable logic control engineering tool; and downloading the system process model to a model predictive control function block in the programmable logic controller and the control logic to a proportional/integral/derivative function block in the programmable logic controller, both function blocks called to implement process equipment control.

20. A model predictive control engineering tool as in claim 19, wherein the system process model is a dynamic matrix model.

* * * * *